July 29, 1924.

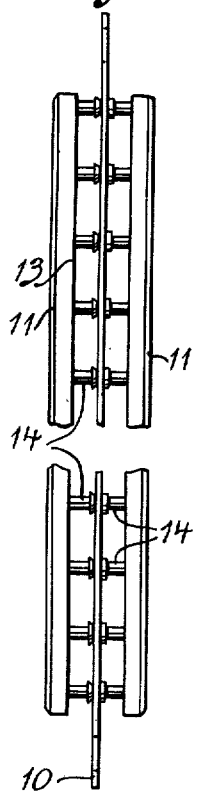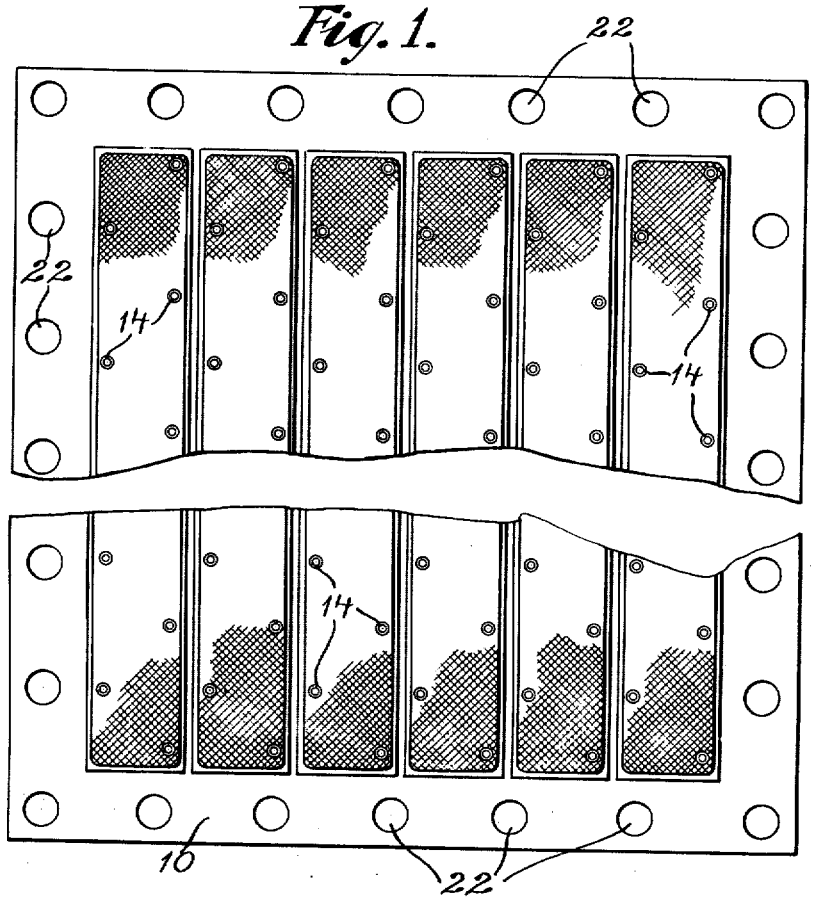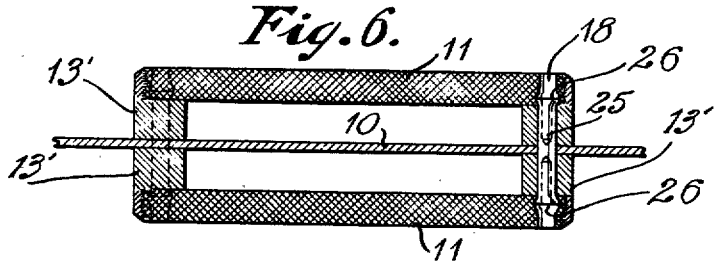

W. G. ALLAN 1,502,708

ELECTRODE

Original Filed Feb. 3, 1920    2 Sheets-Sheet 2

Inventor
Wm. G. Allan.

By
his Attorney

Patented July 29, 1924.

1,502,708

UNITED STATES PATENT OFFICE.

WILLIAM G. ALLAN, OF TORONTO, ONTARIO, CANADA, ASSIGNOR TO THE TORONTO POWER COMPANY, LIMITED, OF TORONTO, CANADA, A CORPORATION OF ONTARIO, CANADA.

ELECTRODE.

Application filed February 3, 1920, Serial No. 355,989. Renewed July 18, 1922. Serial No. 575,811.

*To all whom it may concern:*

Be it known that I, WILLIAM G. ALLAN, a subject of the King of Great Britain, residing at Toronto, county of York, Province of Ontario, Canada, have invented certain new and useful Improvements in Electrodes; and I do hereby declare the following to be a full, clear, and exact description of the invention, such as will enable others skilled in the art to which it appertains to make and use the same.

This invention relates to electrodes, and more particularly, but not exclusively, to electrode structures adapted for use in electrolytic apparatus adapted for production of hydrogen and oxygen from water.

One of the principal objects of the invention is to provide an electrode construction in which the so-called active electrode surface is of such character that various portions thereof may be removed for repair or replacement without disturbing the other portions, thus avoiding the trouble and expense of removing or replacing the active electrode surface as an entirety.

Another object of the invention is to provide an electrode construction which is relatively light but which at the same time is characterized by great strength and rigidity.

Still another object of the invention is to reduce to a minimum contact surfaces or joints between the component parts of the electrode through which current is to flow, and also to ensure that such joints as there are shall be of such character as to exclude entry of the electrolyte, thus preventing development of high resistance contacts and contamination of the hydrogen and oxygen gases obtained.

While the invention in its broader aspects is not restricted to electrodes designed for use in any one particular type of electrolytic apparatus, nevertheless its most important practical application is in connection with electrolytic apparatus of the general type forming the subject matter of my co-pending application, Case A, Serial No. 355,987, filed herewith. Such apparatus, generally described, comprises a plurality of cells electrically connected in series and mechanically assembled in a structural unit. The cells are formed between plates or walls suitably spaced apart, said walls being also electrically insulated from each other when composed of conductive material. Each of the intermediate plates of the unit carries mounted on opposite sides thereof permeable or foraminous electrode surfaces, which are electrically connected to form a bipolar electrode but which are somewhat spaced away from the said plate or cell wall in order to provide for ready disengagement of evolved gases or other products of electrolysis and for adequate circulation of electrolyte. The space between each adjacent pair of such plates with their attached electrode members is divided into an anode chamber and a cathode chamber by means of an interposed separating diaphragm. The end plates of the unit are unipolar electrodes, connected to suitable current supply mains. The whole assemblage of plates, diaphragms, etc. is held together in a manner analogous to the arrangement of the leaves of a filter press.

In constructing apparatus of this general character, the plates carrying the active electrode surfaces and forming the separating walls between adjacent cells may be constructed of sheet metal; and it is desirable to employ as light gauge metal as possible in order to cut down excessive weight, and for the sake of structural compactness. On the other hand it is highly important that the active electrode surface as a whole be accurately and rigidly held at all times in predetermined relation with respect to the mating electrode surface with which it cooperates in the assembled cell construction, and hence a considerable degree of strength and structural rigidity is essential. But in the use of thin supporting plates of light weight, certain difficulties are introduced owing to the ease with which such plates are distorted and deformed. According to the present invention these difficulties are overcome, and the construction of electrodes of the requisite strength, stiffness, and rigidity, even when relatively light gauge metal is employed for the supporting plates, is achieved in a satisfactory and economical manner. Furthermore, the invention renders possible the construction of an electrode in which the active electrode surface is made up of a plurality of sections or panels, individually secured to the backing or supporting plate by special means and in such manner as to enable the parts to be assembled without distortion or deformation of said plate; said sections or panels also being individually removable, when necessary, to effect repair or replacement, without removing the remaining sections or panels of the complete electrode surface.

In order to explain more fully the principles of the invention by means of a concrete illustrative example, an especially desirable practical embodiment thereof is shown in the accompanying drawings, in which Fig. 1 is a view in front elevation of a bipolar electrode structure within the invention;

Fig. 2 is a view thereof in side or edge elevation;

Figs. 5 and 6 are detail sectional views illustrating other modes of mounting the active electrode members on the backing plate, in the case of a bipolar electrode.

Figure 3:
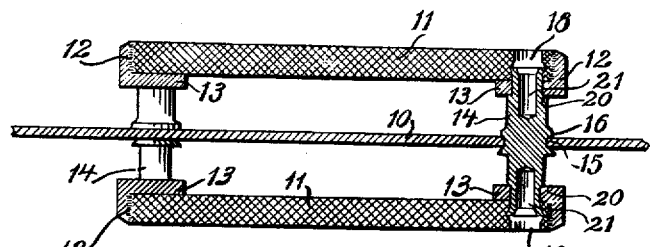
Fig. 3 is a detail sectional view, illustrating one desirable way of mounting the active electrode members on the backing or supporting plate in the case of a bipolar electrode.

Referring to the drawings, 10 represents the backing or supporting plate, which, in the particular embodiment of the invention here illustrated, forms both a support for the so-called active electrode surfaces, mounted on opposite sides of the plate in this instance, and at the same time constitutes a separating wall between adjacent cells when a plurality of such electrode structures are assembled in a complete electrolytic apparatus such as that disclosed in my co-pending application aforesaid. As indicated, the electrode structure is bipolar in this instance, and the active electrode surfaces are foraminous, being composed of metallic wire mesh and being here shown mounted upon the backing plate in the form of panels 11, in a manner which will be more fully hereinafter explained. While the employment of a plurality of panels or sections to constitute an active anode or cathode surface offers practical advantages, as already explained, it is not to be inferred that this invention is restricted to such an arrangement. In the most desirable form of the invention, the active electrode surfaces are composed of a plurality of superposed layers of wire fabric, or of multi-ply woven wire fabric, cut into generally rectangular shape and condensed or compacted into a mass of uniform thickness and substantially plane outer surface as clearly shown in Fig. 3. Each of these dense compact rectangular flat bodies of multi-ply wire mesh has its edges fused as indicated at 12, to provide a stiffening and holding border, which is most desirably also welded at the same time to supporting strips or bus-bars 13 which wholly or partly underlies the marginal portions of the foraminous electrode member, said strips serving, among other things, to aid in attaining effective distribution of current to all parts of the electrode surface. It is to be understood, however, that said strips may be dispensed with in some cases and the fused border alone relied upon for the current distributing function. This assemblage including the aforesaid strips or not, constitutes a rectangular foraminous electrode member. A complete electrode structure may comprise the backing or supporting plate 10 having such an electrode member mounted on one or both sides thereof, or having a composite electrode surface mounted on one or both sides thereof and consisting of a plurality of such electrode members in the form of component sections or panels assembled side by side. The described method of forming the electrode members by fusing the edges of the wire mesh into a stiffening border, and optionally welding such border to additional supporting strips or frame members forms the subject matter of my co-pending application, Case B, Serial No. 355,988, filed herewith, and is therefore not claimed herein.

Figure 4:
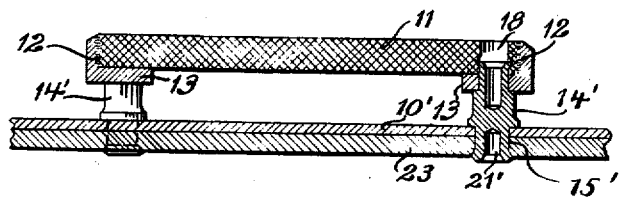
Fig. 4 is a similar view for a unipolar electrode.
Figure 7:
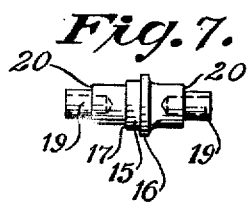
Fig. 7 is a view in side elevation of the mounting pin or stud device employed in the construction illustrated in Fig. 3.

Various expedients may be adopted within the scope of the invention for securing the electrode members in position on the backing plate 10 without distorting the latter. It is also important, in the case of a bipolar electrode to provide a highly conductive path of the shortest possible length between the active electrode faces. Especially effective means for accompilshing the objects in view are illustrated in Figs. 3 and 4. Each of the double hollow-end pins or studs 14, shown in detail in Fig. 7 has a driving fit at 15 in an aperture drilled, punched, or otherwise formed in the backing plate 10. Said studs are relatively short, and are employed in sufficient number to provide in the aggregate a current path of very low resistance. Each said pin or stud is forced into its aperture until the shoulder 16 on the pin abuts one face of the backing plate, the portion 15 of the pin being somewhat longer than the thickness of the backing plate so that shoulder 17 projects slightly beyond the opposite face of the plate when the pin or stud is driven home. By means of a hollow caulking or riveting tool, the shoulder 17 is then spread or expanded slightly to firmly anchor the pin to the plate, and also to caulk the joint tight. The electrode members having been provided in advance with apertures 18, drilled or punched through the body of wire mesh and through the underlying strips 13, may then be forced on over the reduced end portions 19 of the pins or studs previously anchored in position on the supporting plate as above described, the strips or frame members 13 seating on the shoulders 20 of the pins or studs. By inserting a suitable tool into the terminal recesses 21 provided in said pins or studs, the outer ends thereof may be expanded to the necessary extent to firmly grip the electrode panel and hold it tightly against the stud shoulders 20. In the construction illustrated in Fig. 3, the expanded outer ends of the pins bite into the compact foraminous mass forming the electrode surface proper, but this is not essential. During the operations of setting the pins in the plate and securing the panels in place on the pins, the plate may be clamped in a jig device or the like to prevent deformation. The number and cross sectional area of the pins or studs employed are of course such as to provide a conductive path of ample current-carrying capacity between the electrode members on opposite sides of the backing plate; and for this reason it is evidently not essential that said backing plate itself be of conductive material.

It will be seen that by proceeding in the manner described the electrode sections or panels can be rapidly assembled with the relatively thin backing plate without deformation or distortion of the latter, and that the joints between the assembled parts may be made extremely close and tight, the metal surfaces at the joints being forced into such intimate contact, if desired, as to render them liquid tight. Moreover, whether the electrode surface be continuous or in panels or sections as here illustrated, the resultant complete electrode structure is strong and rigid by reason of its box-like form, so that it resists distortion and deformation and always presents, on one or both sides, a smooth and substantially plane active electrode surface adapted to cooperate effectively with similar electrode surfaces in an assembled cell construction. For purposes of assembling, the margin of the backing plate 10 is shown provided with holes 22 to receive means such as through bolts or the like, whereby a plurality of such electrode structures, together with other necessary parts, may be clamped together to form a complete multi-cell unit, similar, for example, to that disclosed in my co-pending application, Case A, Serial No. 355,987, filed herewith. In order to remove any section or panel of the illustrated construction for repair or replacement, it is only necessary to pry the frame members off the studs by means of a tool such as a crow-foot tool or the like, without disturbing the other panels.

In the unipolar electrode construction illustrated in Fig. 4, the same general type of fastening pin or stud means 14' is employed as in the case of the bipolar electrode already described, but in this case the pin or stud is single-ended, as shown. The portion 15' is somewhat longer than the corresponding portion of the double-ended pin, in order to extend through and slightly beyond both the end backing plate 10', and a highly conductive plate 23 of copper or the like, with which the end backing plates of a multi-cell unit may be provided. The stud terminates slightly beyond the face of the plate 23, and its hollow end 21' is expanded to force the metal of the stud into good gripping contact with said plate.

Figure 5:
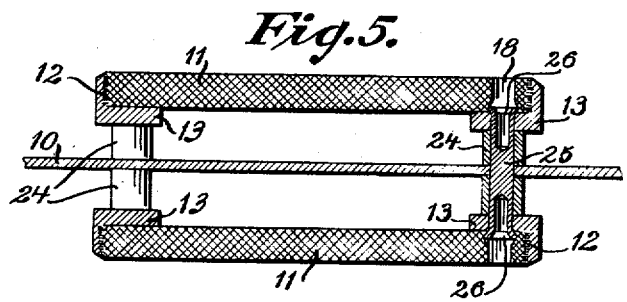

In the arrangement illustrated in Fig. 5, the same general principles are embodied, but in somewhat different form. In this case the frame members or strips 13 are spaced the required distance from the backing plate 10 by spacing collars 24; while straight unshouldered pins 25 extending through said collars and said frame members, have their hollow ends 26 expanded as before, biting into the panels of the bipolar electrode and firmly clamping the oppositely disposed sections or panels to the backing plate. In the construction illustrated in Fig. 6, the spacing collars are omitted, the strips 13' being made thicker to provide the proper spacing distance. In other respects the construction is the same as shown in Fig. 5. Should it be necessary to repair or replace any section or panel, of the constructions shown in Figs. 5 and 6, the pins or studs holding such section on the plate can be easily driven out by means of a suitable tool, without disturbing the other panels.

In the bipolar constructions here illustrated the panels and plates are most desirably assembled, as shown, with the panels on one side registering, respectively, with the panels on the opposite side. The staggered arrangement of the fastening pins or studs, seen best in Fig. 1, is advantageous in both bipolar and unipolar electrodes because of the greater uniformity in stiffening effect thereby attained.

It will be seen that in addition to the other advantages recited above, the electrode construction of the present invention consists of relatively simple parts which can be made up in quantity as by stamping or other simple mechanical operation, and economically assembled in standard units with great rapidity and accuracy, and which are or may be largely interchangeable.

While the construction has been described more particularly in connection with an embodiment of the invention involving a plurality of electrode members mounted on a backing or supporting plate in the manner explained, it will be understood that the advantages of the invention can be realized in part in a construction involving but a single electrode member so mounted. Furthermore the invention, in its broader aspects is not limited to electrodes but may be embodied in other articles, involving the combination of a foraminous member with supporting means to which said member is secured by pin or stud means of the general type described.

What I claim is:

1. The combination with a compressed body of multi-ply material having holes therein, of supporting means therefor, and devices securing said body to said supporting means, such devices comprising parts expanded in said holes.

2. The combination with a sheet-like or plate-like body, of supporting means therefor having holes therein, and devices for mounting said body on said supporting means, said devices having means for spacing said body from said supporting means and also having expanded portions cooperating with said supporting means to secure said devices in said holes.

3. An electrode comprising an electrode element, supporting means therefor, and means having portions expanded into holding engagement with said element for securing said element to its supporting means.

4. An electrode comprising an electrode element, supporting means therefor, and means for mounting said element on its supporting means, such mounting means comprising means for spacing said element from said supporting means and expanded means for securing said element to said supporting means.

5. An electrode comprising a multi-ply body of foraminous conductive material compacted together and having holes therein, supporting means therefor, and members secured to said supporting means and having portions expanded in said holes to secure said multi-ply body to said supporting means.

6. In an electrode, the combination with an electrode element comprising a body of compressed and united layers of foraminous material having holes therein adjacent the margin thereof, of a supporting plate therefor, and members for mounting said element on said plate, such members being secured to said plate and having hollow ends disposed in said holes in the electrode element, such ends being expanded into biting engagement with said material.

7. An electrode comprising an electrode element, a supporting plate therefor, and means for mounting said element on said plate comprising means abutting against said plate and against said element to maintain them in spaced relation, and expanded into holding relation with said plate and said element to secure them together.

8. An electrode comprising a plurality of electrode elements, a supporting plate therefor, and means for mounting said elements on said plate comprising means for maintaining said elements in spaced relation to said plate, and means expanded into holding relation with said plate and elements to secure them together.

9. An electrode comprising a supporting plate or the like, and a plurality of flat electrode elements individually mounted thereon in close arrangement to provide a complete electrode face.

10. A bipolar electrode comprising a supporting plate or the like, and a group of cooperating electrode panels mounted upon each side of said supporting plate, the panels of each group having their outer faces disposed substantially in the same plane, and each element of one group being arranged opposite a corresponding element of the other group on the opposite side of the supporting plate.

11. An electrode comprising the combination, with a plurality of substantially plane foraminous conductive panels each provided with a frame, of a backing plate, and fastening means engaging each said frame and rigidly connecting said panels to said plate in spaced relation thereto.

12. An electrode comprising the combination, with a conductive supporting plate, of a plurality of foraminous conductive panels disposed side by side on both sides of said plate and rigidly secured thereto but spaced therefrom.

13. An electrode comprising the combination, with a conductive supporting plate, of a plurality of farminous conductive panels disposed side by side on both sides of said plate in opposed pairs, and means extending through said plate and rigidly connecting the opposed members of each pair to said plate.

14. An electrode comprising supporting means, in combination with a plurality of panel-like electrode elements secured thereto and cooperating to provide an electrode face, each of said elements being removable from said supporting means without disturbing the other panels comprising said face.

15. An electrode comprising the combination, with a plurality of substantially plane panels of foraminous conductive material, of a supporting plate to which said panels are secured side by side.

16. In an electrode, the combination, with a plurality of substantially plane panels each comprising foraminous conductive material carried by a frame, of a backing plate, and fastening means securing said panels individually to said backing plate with said foraminous material spaced away from said plate.

17. In an electrode, the combination, with a backing plate, of a foraminous electrode member comprising foraminous sheet material and a border of frame underlying said material and to which said sheet material is marginally secured, and a plurality of fastening devices securing said electrode member in parallel spaced relation to said plate, each said device comprising a pin or stud anchored to said plate and extending through said frame, and having a hollow end portion expanded into gripping engagement with said foraminous sheet material.

18. In an electrode, the combination, with a backing plate, of an electrode member and a plurality of devices securing said member in spaced relation to said plate, each securing device comprising a pin or stud anchored to said plate and extending into an opening provided in said electrode member, said pin being shouldered at a distance from said plate and having its end expanded to hold said electrode member against such shoulder and thus spaced away from said plate.

19. In an electrode, the combination, with a backing plate, of two sets of electrode panels disposed on opposite sides of said plate, each panel of one set registering with a panel of the opposed set, and means connecting the panels of each such registering pair in spaced relation to said plate, such connecting means comprising a stud or pin extending through and anchored to said plate, the portions of said pin or stud projecting on opposite sides of said plate each being shouldered to engage the adjacent side of the corresponding panel and extending into an aperture provided in said panel, and each end of said pin or stud being hollow and expanded to hold the corresponding panel firmly against such shoulder.

20. In an electrode, the combination, with a backing plate, of a plurality of electrode panels arranged side by side, and fastening pins or studs each terminally anchored both in said plate and in one of said panels, said pins or studs being in staggered arrangement.

21 The combination, with a foraminous metal member, of a support therefor, and a plurality of stud or pin devices by which said member is secured to said support and is at the same time spaced therefrom.

22. The combination, with a foraminous laminated mass of metal fabric compacted into a flat member having a plane face, of a supporting plate or the like, and a plurality of stud or pin devices whereby said member is marginally secured to said plate or the like and is at the same time spaced therefrom.

23. The combination, with a foraminous metal fabric member having a plane face, of a supporting plate or the like, and a plurality of stud or pin devices marginally securing said member to said plate or the like and spacing said member therefrom.

24. In an electrode device, the combination, with a back supporting plate, of two sets of electrode panels disposed on opposite sides of said plate, each panel of one set registering with a similar panel of the opposed set, and each electrode panel being provided with a metallic and conductive border frame marginally secured to said panel and running around all its four sides, of spacing means extending between the rear side of said border frames and the adjacent side of said plate, said spacing means consisting of a hollow cylindrical, square, or rectangular ferrule or washer, or a series of such ferrules or washers, each provided with parallel end faces, and of equal thickness between said faces, in such manner as to maintain said electrode panels in parallel and spaced relation to said back supporting plate as well as to assist in increasing the electrical conductivity of the path or paths between said panels and said plate, and securing or connecting means passing through registering holes or apertures in said border frames, spacing ferrules or washers and plate, in such manner as both mechanically and electrically to secure and connect said opposed registering electrode panels to one another and to said plate by means of a joint which shall prevent passage of gas from one side of said plate to the other, said securing or connecting means being in the form of straight parallel sided pins fitting tightly in said holes or apertures and being driven into same, and being provided at each of their ends with hollow end portions which are expanded into gripping engagement either with the border frames or with the electrode panels, or with both, said straight parallel sided pins being of such cross sectional area and in such numbers as to complete and provide the major portion of the electrically conducting path or paths between said oppositely registering panels, or between any one of said panels and said plate.

25. In an electrode, the combination, with a back supporting plate, of two sets of electrode panels disposed on opposite sides of said plate, each panel of one set registering with a similar panel of the opposed set and each electrode panel being provided with two heavy metallic and conductive frame members marginally secured to said panels and running longitudinally along two of its four sides, said frame members having parallel faces and extending between the rear side of said electrode panels and the adjacent side of said plate in such manner as to maintain said panels and said plate in parallel and spaced relation as well as in electrical contact by means of a path of high conductivity, and securing or connecting means passing through registering holes or apertures in said heavy border frames and in said plates in such manner as both mechanically and electrically to secure and connect said opposed registering electrode panels to one another and to said plate by means of a joint which shall prevent passage of gas from one side of said plate to the other, said securing or connecting means being in the form of straight parallel sided pins fitting tightly in said holes or apertures and being driven into same, and being provided at each of their ends with hollow end portions which are expanded into gripping engagement either with the border frames, or with the electrode panels, or with both.

26. In an electrode, the combination, with a backing plate, of an electrode member and a plurality of devices securing said member in spaced relation to said plate, each such securing device comprising a pin or stud anchored to said plate and being shouldered at a suitable distance from said plate, and said electrode member being supported against such shoulder and thus spaced away from said plate.

27. In an electrode, the combination, with a backing plate, of two sets of electrode panels disposed on opposite sides of said plate, each panel of one set registered with a panel of the opposed set, and means connecting the panels of each such registering pair in spaced relation to said plate, such connecting means comprising studs or pins each extending through and anchored to said plate and having shouldered portions projecting on opposite sides of said plate for engagement with the adjacent side of the corresponding panel. said panel being supported against the shoulders of said pins or studs.

28. The combination, with a foraminous metal fabric member having a plane face, of a supporting plate or the like, and a plurality of supporting devices securing said member at a plurality of distributed points at the margin thereof to said plate or the like and spacing said member therefrom.

29. A compacted or densified multi-ply electrode structure, comprising a plurality of superposed layers of woven wire cloth or fabric marginally secured together by welding or fusing down the edges of said several layers into a bead or border of solid metal, said electrode structure being supported from a back plate by spacing means, and said electrode structure being also stretched tightly across the ends of said spacing means in two directions substantially in line with the warp and woof wires of said woven wire cloth.

In testimony whereof I hereunto affix my signature.

WILLIAM G. ALLAN.

Certificate of Correction.

It is hereby certified that Letters Patent No. 1,502,708, granted July 29, 1924, upon the application of William G. Allan, of Toronto, Ontario, Canada, for an improvement in "Electrodes," were erroneously issued to "The Toronto Power Company Limited," as assignee of the entire interest in said invention, whereas said Letters Patent should have been issued to *John P. Scott, of Toronto, Ontario, Canada*, said Scott being assignee, by *mesne assignments*, of the entire interest in said invention, as shown by the records of assignments in this office; and that the said Letters Patent should be read with this correction therein that the same may conform to the record of the case in the Patent Office.

Signed and sealed this 14th day of October, A. D. 1924.

[SEAL.]

KARL FENNING,
*Acting Commissioner of Patents.*